UNITED STATES PATENT OFFICE.

WILLIAM THOMAS, JR., OF HINGHAM, MASSACHUSETTS.

IMPROVEMENT IN STOVE-BLACKING.

Specification forming part of Letters Patent No. 15,956, dated October 21, 1856.

*To all whom it may concern:*

Be it known that I, WILLIAM THOMAS, Jr., of Hingham, in the county of Plymouth and State of Massachusetts, have invented a new and useful Compound to be Used as a Coating and Polish for Stoves and Iron Surfaces; and I do hereby declare that the following is a full, clear, and exact description of the same.

The nature of my invention consists of a compound of black-lead, lamp-black, asphaltum-varnish, manganese, and turpentine to form a beautiful polish for stoves and an excellent protection of iron surfaces from rust.

To enable others skilled in the art to make and use my invention, I will proceed to describe it briefly and clearly.

I take about two ounces of good black-lead, or powdered graphite, one and a half ounce of good lamp-black, one ounce of common asphaltum-varnish, half an ounce of the oxide of manganese, and one and a half gill of common spirits of turpentine. These are mixed all together in a stoneware or other suitable vessel by stirring them with a wooden spatula until they are thoroughly incorporated together, when the compound thus formed may be applied to the surface of stoves and iron plates, &c.

It is applied as follows: It is first put on the surface of a stove with a brush, like paint, and allowed to dry. Then it is rubbed with a common polishing-brush, when it assumes a brilliant shining polish, and forms a far more durable and superior polish or shining coating for stoves than black-lead or any other polish known to me, and it can also be applied with much less labor and more rapidly than any common stove-polish.

The asphaltum-varnish used in my polish is the kind commonly sold under that name and so generally known.

The lamp-black in my polish serves to fill up all the pores and small cavities generally found in stove plates and castings, so that a very smooth and even surface is thus formed. The use of the asphaltum-varnish is to make the polish very adhesive and protective to the iron, while the black-lead and manganese mixed with the turpentine enable the whole to dry rapidly and to take a brilliant polish when rubbed up with a brush.

The proportions given of the different materials I have found are the best for making such a good and useful liquid polish; but a variation of the component parts might be used without departing from the useful nature of the compound and invention.

Having thus described my invention, I claim—

The within-described compound to be used for coating stoves and metallic surfaces to impart to them a very durable polish and to protect them more effectually from rust, as set forth.

WILLIAM THOMAS, JR.

Witnesses:
 CALEB B. MARSH,
 JOSHUA L. HIGGINS.